United States Patent [19]

Schmidt

[11] 4,380,553
[45] Apr. 19, 1983

[54] METHOD OF IMPARTING A REDDISH COLOR TO SEASONING SALTS

[75] Inventor: Thomas R. Schmidt, Niles, Mich.

[73] Assignee: Miles Laboratories, Inc., Elkhart, Ind.

[21] Appl. No.: 299,192

[22] Filed: Sep. 3, 1981

[51] Int. Cl.³ .............................................. A23L 1/237
[52] U.S. Cl. .................................... 426/250; 426/540; 426/649
[58] Field of Search ................. 426/250, 540, 648, 649

[56] References Cited

U.S. PATENT DOCUMENTS 3,269,845  8/1966  Pomeroy ............................. 426/250
4,315,947  2/1982  Todd, Jr. et al. .................... 426/540

OTHER PUBLICATIONS

Label from McCormick "Season-All" Seasoned Salt, 1976.

Primary Examiner—William F. Smith
Attorney, Agent, or Firm—Jerome L. Jeffers

[57] ABSTRACT

The present invention is a method of imparting a reddish color to granulated seasoning salts. The method involves forming a slurry of annatto, by acid precipitation from an alkaline solution, and blending this slurry with the salt to plate the annatto thereon. The resulting pigmented salt is useful for the seasoning of snack foods to give them a barbequed appearance.

6 Claims, No Drawings

METHOD OF IMPARTING A REDDISH COLOR TO SEASONING SALTS

BACKGROUND OF THE INVENTION

Many seasoning blends or seasoning salts are coated with paprika or paprika/turmeric mixtures to impart color thereto. Typically, a brick red color is desired, especially when the seasoning is to be used to coat snack foods to give them a barbequed flavor appearance. However, the desired brick red color is not always attainable with paprika. Furthermore, paprika oleoresin, from which the paprika is deposited, is relatively expensive.

Annatto, i.e., the orange coloring matter from the pulp of the fruit seeds of the evergreen Bixa orellana is acceptable for use as a coloring in foods and is known to be useful in the coloration of cheese and milk.

Annato is soluble in water at a basic pH and can be obtained commercially in aqueous solution. The material can be used as a coloring in the form of its solution or the pigment can be dispersed in various emulsifying agents and incorporated into the food to be colored in this form.

SUMMARY OF THE INVENTION

The present invention is a method of treating granulated seasoning salt to thereby impart a reddish color thereto. The method involves the steps of:

(a) providing a basic, aqueous solution of annatto;

(b) adding a food grade acid to the basic solution to lower the pH thereof to a point sufficient to precipitate the annatto forming an aqueous slurry thereof;

(c) combining the annatto slurry with the granulated seasoning salt and blending the resultant combination to thereby plate the salt with the precipitated annatto; and (d) allowing the plated salt to dry.

DESCRIPTION OF THE INVENTION

Alkaline, aqueous annatto solutions containing about 0.75 to 5% (w/w) annatto pigment are commercially available. For example the material can be obtained as single or double strength water soluble concentrates. These solutions are prepared by extracting the pigment from the plant material by means of NaOH or KOH. Annatto solids other than the pigment are dissolved during this procedure. The pigment remains water soluble at a pH of above 8.0 but can be precipitated by the addition of an acid to lower the pH below this level. For most applications within the scope of this invention lowering the pH to a level of about 3.0 to 6.0 is preferred. Any foodgrade acid, with the exception of acetic acid which solubilizes annatto, can be used to lower the solution's pH to the desired level. Exemplary of acids which can be used to precipitate the annatto are HCl, malic, phosphoric and citric acids.

Acidification of the alkaline annatto solution results in the formation of a heavy precipitate of the pigment. Forming a slurry by acid precipitation of the annatto in which the total solids constitute about 4 to 20% (w/w) of the mixture, provides a material suitable for plating the pigment upon the seasoning salt substrate. Typically, finely granulated NaCl or KCl is the salt which is treated by this process. Combining the salt with the annatto slurry and thoroughly blending the resulting mixture provides a red colored salt suitable for the use contemplated herein. Preferably, the amount of annatto slurry, containing a solids concentration in the range discussed above, to be mixed with the salt to be treated will be from 0.75 to 13% of the salt (w/w). The amount of slurry used should be varied inversely with the solids concentration to provide the necessary amount of pigment without adding too large an amount of water to the salt. The blending process is carried out by techniques familiar to those skilled in the art of color plating.

The method of practicing the present invention is further illustrated by the following example.

EXAMPLE I

There was weighed out 2.5 g. of alkaline annatto solution (double strength obtained from Miles Laboratories, Inc.) which solution had a pH of 12.5. To this solution was added concentrated HCl in sufficient quantity to lower the pH to a level of about 3.5 to 4.0 whereupon a heavy red precipitate formed. The precipitated solution was combined with 25 g. of granular sodium chloride and the resultant blended thoroughly in a silent cutter type blender. After removal from the blender and air drying, the treated salt had a deep orange to reddish-orange hue.

Coating the annatto treated salt onto potato chips at the 25% (w/w) use level resulted in a very good appearance, especially when finely granulated (snack coating) salt was used, which would render the treated potato chips useful as a barbecued type snack food.

What is claimed is:

1. A method of treating granulated seasoning salt to impart a reddish hue thereto which method involves the steps of:

(a) providing a basic, aqueous solution of annatto;

(b) adding a food grade acid to the basic solution to lower the pH thereof to a point sufficient to precipitate the annatto and form an aqueous slurry thereof;

(c) combining the annatto slurry with the granulated seasoning salt and blending the resultant combination to thereby plate the salt with the precipitated annatto; and (d) allowing the plated salt to dry.

2. The method of claim 1 wherein the pH of the annatto solution is lowered to a level of from 3.0 to 6.0.

3. The method of claim 1 wherein the acid is HCl, malic, phosphoric or citric acid.

4. The method of claim 1 wherein the annatto solution is of a concentration to provide a slurry containing from 4 to 20% (w/w) of total solids upon acid precipitation.

5. The method of claim 4 wherein the amount of slurry combined with the granulated seasoning salt is from 0.75 to 13% (w/w) of the salt.

6. The method of claim 1 wherein the seasoning salt is NaCl or KCl.

* * * * *